United States Patent
Li et al.

(10) Patent No.: US 10,395,649 B2
(45) Date of Patent: Aug. 27, 2019

(54) PRONUNCIATION ANALYSIS AND CORRECTION FEEDBACK

(71) Applicant: International Business Machines Corporation, Armonk, NY (US)

(72) Inventors: Zhichao Li, Austin, TX (US); Kai Liu, Beijing (CN); Su Liu, Austin, TX (US); Manjunath Ravi, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 74 days.

(21) Appl. No.: 15/844,385

(22) Filed: Dec. 15, 2017

(65) Prior Publication Data

US 2019/0189116 A1 Jun. 20, 2019

(51) Int. Cl.
*G10L 15/187* (2013.01)
*G10L 15/07* (2013.01)
*G10L 15/18* (2013.01)
*G10L 15/22* (2006.01)

(52) U.S. Cl.
CPC ............ *G10L 15/187* (2013.01); *G10L 15/07* (2013.01); *G10L 15/1822* (2013.01); *G10L 15/22* (2013.01)

(58) Field of Classification Search
CPC .................................................. G10L 15/187
USPC ........................................................ 704/235
See application file for complete search history.

(56) References Cited

U.S. PATENT DOCUMENTS

| | | | |
|---|---|---|---|
| 5,068,789 A | 11/1991 | van Vliembergen | |
| 5,940,793 A * | 8/1999 | Attwater | G10L 15/18 704/231 |
| 5,995,932 A | 11/1999 | Houde | |
| 7,315,821 B2 | 1/2008 | Monchi et al. | |
| 7,593,849 B2 | 9/2009 | Das et al. | |
| 8,175,882 B2 | 5/2012 | Basson et al. | |
| 8,352,263 B2 * | 1/2013 | Li | G10L 15/10 704/231 |
| 8,682,678 B2 | 3/2014 | Malkin et al. | |
| 8,793,139 B1 * | 7/2014 | Serban | G10L 15/22 704/275 |

(Continued)

FOREIGN PATENT DOCUMENTS

JP 2008268478 A 11/2008

OTHER PUBLICATIONS

Aryal et al., "Accent Conversion Through Cross-Speaker Articulatory Synthesis," IEEE International Conference on Acoustic, Speech and Signal Processing, 2014, pp. 7694-7698.

(Continued)

*Primary Examiner* — Susan I McFadden
(74) *Attorney, Agent, or Firm* — Zilka-Kotab, P.C.

(57) ABSTRACT

A computer-implemented method according to one embodiment includes receiving voice input, parsing the voice input for determining words in the voice input, recognizing at least some of the words, identifying an accent of a speaker of the voice input, evaluating a word accent of at least some of the recognized words based on the identified accent of the speaker and analysis of the recognized words, generating an evaluated accent score for each of the at least some of the recognized words based on the evaluated word accent, identifying at least one of the recognized words as an accent word based on the evaluated accent score thereof, and outputting a recommended correct pronunciation of the accent word or words.

13 Claims, 8 Drawing Sheets

(56) References Cited

U.S. PATENT DOCUMENTS

| | | | | |
|---|---|---|---|---|
| 8,917,842 | B2* | 12/2014 | Rashid | H04M 3/02 379/142.06 |
| 9,552,810 | B2 | 1/2017 | Belisario et al. | |
| 10,186,251 | B1* | 1/2019 | Mohammadi | G10L 13/047 |
| 2005/0203729 | A1* | 9/2005 | Roth | H04M 1/72563 704/5 |
| 2007/0038455 | A1 | 2/2007 | Murzina et al. | |
| 2008/0147404 | A1 | 6/2008 | Liu et al. | |
| 2017/0154622 | A1 | 6/2017 | Liu et al. | |
| 2017/0287356 | A1* | 10/2017 | Stephen | G09B 19/06 |
| 2018/0190269 | A1* | 7/2018 | Lokeswarappa | G09B 5/04 |
| 2018/0330715 | A1* | 11/2018 | Lee | G09B 19/06 |

OTHER PUBLICATIONS

Aryal et al., "Foreign Accent Conversion Through Voice Morphing," Interspeech 2013, Aug. 25-29, 2013, pp. 3077-3081.

Cho et al., "Towards an Automatic Foreign Accent Reduction Tool," Speech Prosody 2006, May 2-5, 2006, pp. 1-4.

Felps et al., "Foreign Accent Conversion Through Concatenative Synthesis in the Articulatory Domain," IEEE Transactions on Audio, Speech, and Language Processing, vol. 20, No. 8, Oct. 2012, pp. 2301-2312.

Felps et al., "Developing Objective Measures of Foreign-Accent Conversion," IEEE Transactions on Audio, Speech, and Language Processing, vol. 18, No. 5, Jul. 2010, pp. 1030-1040.

Hynes, C., "The App Using Artificial Intelligence to Improve English Speaking Skills," forbes.com, Aug. 30, 2016, pp. 1-2, https://www.forbes.com/sites/chynes/2016/08/30/the-app-using-artificial-intelligence-to-improve-english-speaking-skills/#1abb25b31c82.

IBM, "An accent enhancement system by modifying the speech signal," IP.com, No. IPCOM000063619D, Feb. 18, 2005, pp. 1-5.

IBM, "System for Automatic Accent Suppression," IP.com, No. IPCOM000168057D, Feb. 28, 2008, pp. 1-4.

Anonymous, "Accented Speech Modulation," IP.com, No. IPCOM000226026D, Mar. 20, 2013, pp. 1-8.

Zhao et al., "Feedback Utterances for Computer-Aided Language Learning Using Accent Reduction and Voice Conversion Method," IEEE International Conference on Acoustics, Speech and Signal Processing, 2013, pp. 8208-8212.

* cited by examiner

| Word | Accent score | Word | Accent score | Word | Accent score |
|---|---|---|---|---|---|
| computer | 0.7 | communication | 0.6 | heterogeneous | 0.9 |
| academy | 0.7 | globalization | 0.5 | good | 0.1 |
| Amazon | 0.6 | heirarchical | 0.8 | morning | 0.9 |

FIG. 7

PRONUNCIATION ANALYSIS AND CORRECTION FEEDBACK

BACKGROUND

The present invention relates to language pronunciation, and more specifically, this invention relates to correcting and/or improving pronunciation.

It is estimated that over 1 billion people are currently learning English worldwide, and according to the British Council, as of the year 2000, there were 750 million people who spoke English as foreign language speakers. In addition, as of the year 2000, it was reported that there were 375 million people who spoke English as a second language. As of 2014, the number of people learning English worldwide increased to 1.5 billion people.

English however, is not the only language that is gaining students. For example, Arabic, Italian, and Spanish are all languages that are taught and learned continually worldwide.

As a language such as English is learned and practiced, some speakers develop and/or normally speak with an accent. Such accents tend to correlate to the geographical location at which the language was learned, the native language of the speaker that is speaking an accent, pronunciation instructions that the speaker was given, etc.

SUMMARY

A computer-implemented method according to one embodiment includes receiving voice input, parsing the voice input for determining words in the voice input, recognizing at least some of the words, identifying an accent of a speaker of the voice input, evaluating a word accent of at least some of the recognized words based on the identified accent of the speaker and analysis of the recognized words, generating an evaluated accent score for each of the at least some of the recognized words based on the evaluated word accent, identifying at least one of the recognized words as an accent word based on the evaluated accent score thereof, and outputting a recommended correct pronunciation of the accent word or words.

A computer-implemented method for maintaining a personal accent word list according to another embodiment includes registering an accent word and an accent score thereof into a personal accent word list of a speaker, receiving an updated accent score for the accent word, determining whether the updated accent score for the accent word is in a predefined range, updating the score of the accent word based on the updated accent score in response to the updated accent score being outside the predefined range, and removing the accent word from the personal accent word list in response to the updated accent score being in the predefined range.

A computer program product for real time pronunciation analysis and correction feedback according to yet another embodiment includes a computer readable storage medium having program instructions embodied therewith. The computer readable storage medium is not a transitory signal per se. The program instructions are readable and/or executable by a computer, to cause the computer to perform a method including receiving, by the computer, voice input. The voice input is parsed by the computer for determining words in the voice input. At least some of the words are recognized by the computer. An accent of a speaker of the voice input is identified by the computer. A word accent of the recognized words is evaluated by the computer based on the identified accent of the speaker and analysis of the recognized words. An evaluated accent score is generated by the computer for each of the recognized words based on the evaluated word accent. At least one of the recognized words are identified by the computer as an accent word based on the evaluated accent score thereof. Moreover, a recommended correct pronunciation of the accent word or words is output by the computer.

Other aspects and embodiments of the present invention will become apparent from the following detailed description, which, when taken in conjunction with the drawings, illustrate by way of example the principles of the invention.

BRIEF DESCRIPTION OF THE DRAWINGS

FIG. 7 is a table of personal accent words and associated scores for a particular user, in accordance with one embodiment.

DETAILED DESCRIPTION

Figure 1:
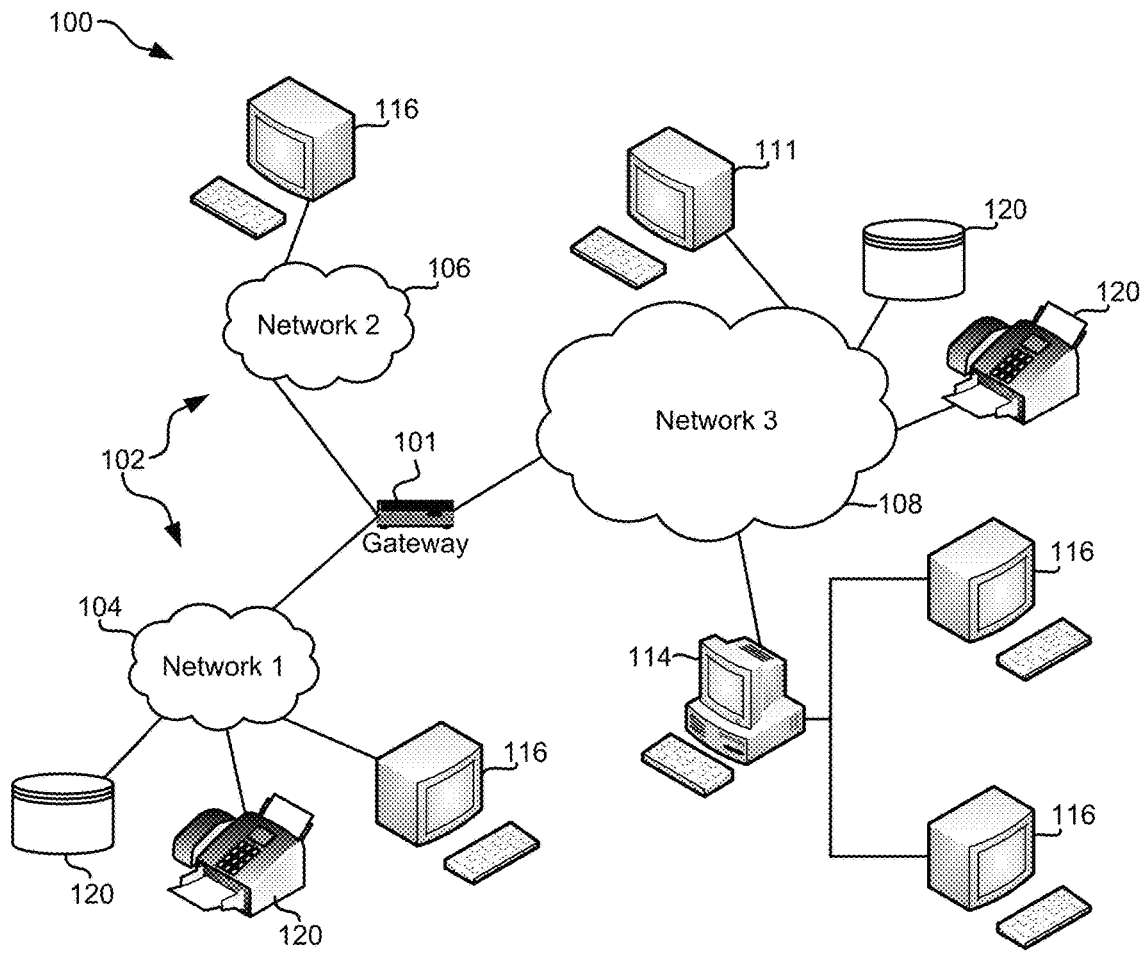
FIG. 1 is a diagram illustrating a network architecture, in accordance with one embodiment.

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an" and "the" include plural referents unless otherwise specified. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The following description discloses several preferred embodiments of systems, methods and computer program products for real time pronunciation correction.

In one general embodiment, a computer-implemented method includes receiving voice input, parsing the voice input for determining words in the voice input, recognizing at least some of the words, identifying an accent of a speaker of the voice input, evaluating a word accent of at least some of the recognized words based on the identified accent of the speaker and analysis of the recognized words, generating an evaluated accent score for each of the at least some of the recognized words based on the evaluated word accent, identifying at least one of the recognized words as an accent word based on the evaluated accent score thereof, and outputting a recommended correct pronunciation of the accent word or words.

In another general embodiment, a computer-implemented method for maintaining a personal accent word list includes registering an accent word and an accent score thereof into a personal accent word list of a speaker, receiving an updated accent score for the accent word, determining whether the updated accent score for the accent word is in a predefined range, updating the score of the accent word based on the updated accent score in response to the updated accent score being outside the predefined range, and removing the accent word from the personal accent word list in response to the updated accent score being in the predefined range.

In another general embodiment, a computer program product for real time pronunciation analysis and correction feedback includes a computer readable storage medium having program instructions embodied therewith. The computer readable storage medium is not a transitory signal per se. The program instructions are readable and/or executable by a computer, to cause the computer to perform a method including receiving, by the computer, voice input. The voice input is parsed by the computer for determining words in the voice input. At least some of the words are recognized by the computer. An accent of a speaker of the voice input is identified by the computer. A word accent of the recognized words is evaluated by the computer based on the identified accent of the speaker and analysis of the recognized words. An evaluated accent score is generated by the computer for each of the recognized words based on the evaluated word accent. At least one of the recognized words are identified by the computer as an accent word based on the evaluated accent score thereof. Moreover a recommended correct pronunciation of the accent word or words is output by the computer.

FIG. 1 illustrates an architecture 100, in accordance with one embodiment. As shown in FIG. 1, a plurality of remote networks 102 are provided including a first remote network 104 and a second remote network 106. A gateway 101 may be coupled between the remote networks 102 and a proximate network 108. In the context of the present architecture 100, the networks 104, 106 may each take any form including, but not limited to a local area network (LAN), a wide area network (WAN) such as the Internet, public switched telephone network (PSTN), internal telephone network, etc.

In use, the gateway 101 serves as an entrance point from the remote networks 102 to the proximate network 108. As such, the gateway 101 may function as a router, which is capable of directing a given packet of data that arrives at the gateway 101, and a switch, which furnishes the actual path in and out of the gateway 101 for a given packet.

Further included is at least one data server 114 coupled to the proximate network 108, and which is accessible from the remote networks 102 via the gateway 101. It should be noted that the data server(s) 114 may include any type of computing device/groupware. Coupled to each data server 114 is a plurality of user devices 116. User devices 116 may also be connected directly through one of the networks 104, 106, 108. Such user devices 116 may include a desktop computer, lap-top computer, hand-held computer, printer or any other type of logic. It should be noted that a user device 111 may also be directly coupled to any of the networks, in one embodiment.

A peripheral 120 or series of peripherals 120, e.g., facsimile machines, printers, networked and/or local storage units or systems, etc., may be coupled to one or more of the networks 104, 106, 108. It should be noted that databases and/or additional components may be utilized with, or integrated into, any type of network element coupled to the networks 104, 106, 108. In the context of the present description, a network element may refer to any component of a network.

According to some approaches, methods and systems described herein may be implemented with and/or on virtual systems and/or systems which emulate one or more other systems, such as a UNIX system which emulates an IBM z/OS environment, a UNIX system which virtually hosts a MICROSOFT WINDOWS environment, a MICROSOFT WINDOWS system which emulates an IBM z/OS environment, etc. This virtualization and/or emulation may be enhanced through the use of VMWARE software, in some embodiments.

In more approaches, one or more networks 104, 106, 108, may represent a cluster of systems commonly referred to as a "cloud." In cloud computing, shared resources, such as processing power, peripherals, software, data, servers, etc., are provided to any system in the cloud in an on-demand relationship, thereby allowing access and distribution of services across many computing systems. Cloud computing typically involves an Internet connection between the systems operating in the cloud, but other techniques of connecting the systems may also be used.

Figure 2:
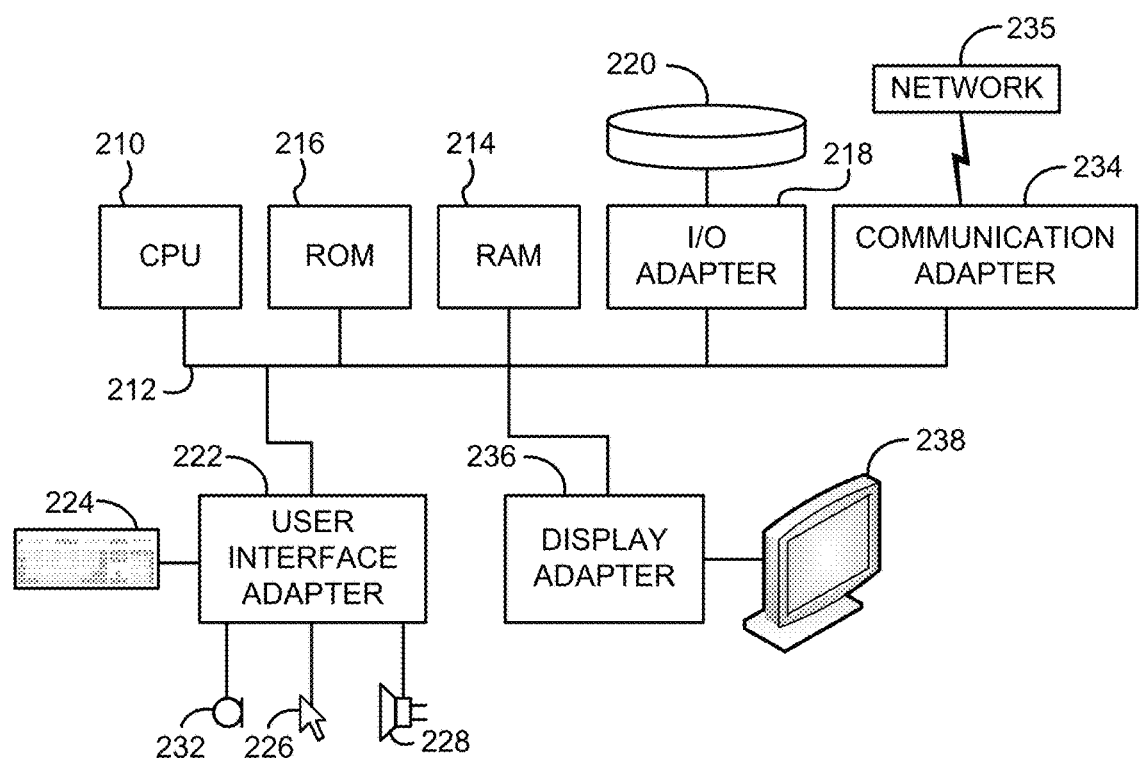
FIG. 2 is a diagram illustrating a representative hardware environment that may be associated with the servers and/or clients of FIG. 1, in accordance with one embodiment.

FIG. 2 shows a representative hardware environment associated with a user device 116 and/or server 114 of FIG. 1, in accordance with one embodiment. Such figure illustrates a typical hardware configuration of a workstation having a central processing unit 210, such as a microprocessor, and a number of other units interconnected via a system bus 212.

The workstation shown in FIG. 2 includes a Random Access Memory (RAM) 214, Read Only Memory (ROM) 216, an input/output (I/O) adapter 218 for connecting peripheral devices such as disk storage units 220 to the bus 212, a user interface adapter 222 for connecting a keyboard 224, a mouse 226, a speaker 228, a microphone 232, and/or other user interface devices such as a touch screen and a digital camera (not shown) to the bus 212, communication adapter 234 for connecting the workstation to a communication network 235 (e.g., a data processing network) and a display adapter 236 for connecting the bus 212 to a display device 238.

The workstation may have resident thereon an operating system such as the Microsoft Windows® Operating System (OS), a MAC OS, a UNIX OS, etc. It will be appreciated that a preferred embodiment may also be implemented on platforms and operating systems other than those mentioned. A preferred embodiment may be written using eXtensible Markup Language (XML), C, and/or C++ language, or other programming languages, along with an object oriented programming methodology. Object oriented programming (OOP), which has become increasingly used to develop complex applications, may be used.

Figure 3:
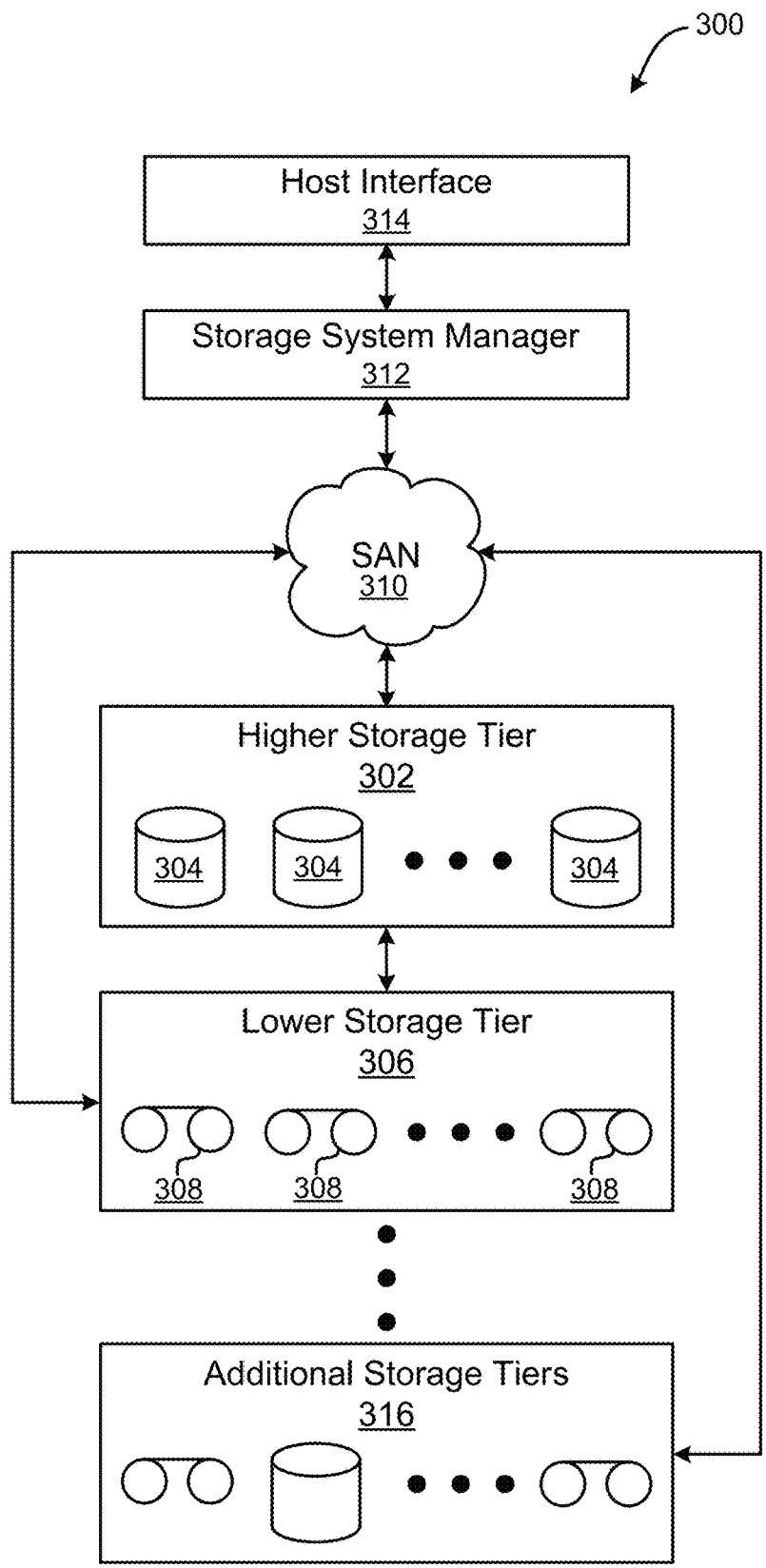
FIG. 3 is a representative diagram depicting a tiered data storage system in accordance with one embodiment.

Now referring to FIG. 3, a storage system 300 is shown according to one embodiment. Note that some of the elements shown in FIG. 3 may be implemented as hardware and/or software, according to various embodiments. The storage system 300 may include a storage system manager 312 for communicating with a plurality of media and/or drives on at least one higher storage tier 302 and at least one lower storage tier 306. The higher storage tier(s) 302 preferably may include one or more random access and/or direct access media 304, such as hard disks in hard disk drives (HDDs), nonvolatile memory (NVM), solid state memory in solid state drives (SSDs), flash memory, SSD arrays, flash memory arrays, etc., and/or others noted herein or known in the art. The lower storage tier(s) 306 may preferably include one or more lower performing storage media 308, including sequential access media such as magnetic tape in tape drives and/or optical media, slower accessing HDDs, slower accessing SSDs, etc., and/or others noted herein or known in the art. One or more additional storage tiers 316 may include any combination of storage memory media as desired by a designer of the system 300. Also, any of the higher storage tiers 302 and/or the lower storage tiers 306 may include some combination of storage devices and/or storage media.

The storage system manager 312 may communicate with the drives and/or storage media 304, 308 on the higher storage tier(s) 302 and lower storage tier(s) 306 through a network 310, such as a storage area network (SAN), as shown in FIG. 3, or some other suitable network type. The storage system manager 312 may also communicate with one or more host systems (not shown) through a host interface 314, which may or may not be a part of the storage system manager 312. The storage system manager 312 and/or any other component of the storage system 300 may be implemented in hardware and/or software, and may make use of a processor (not shown) for executing commands of a type known in the art, such as a central processing unit (CPU), a field programmable gate array (FPGA), an application specific integrated circuit (ASIC), etc. Of course, any arrangement of a storage system may be used, as will be apparent to those of skill in the art upon reading the present description.

In more embodiments, the storage system 300 may include any number of data storage tiers, and may include the same or different storage memory media within each storage tier. For example, each data storage tier may include the same type of storage memory media, such as HDDs, SSDs, sequential access media (tape in tape drives, optical disc in optical disc drives, etc.), direct access media (CD-ROM, DVD-ROM, etc.), or any combination of media storage types. In one such configuration, a higher storage tier 302, may include a majority of SSD storage media for storing data in a higher performing storage environment, and remaining storage tiers, including lower storage tier 306 and additional storage tiers 316 may include any combination of SSDs, HDDs, tape drives, etc., for storing data in a lower performing storage environment. In this way, more frequently accessed data, data having a higher priority, data needing to be accessed more quickly, etc., may be stored to the higher storage tier 302, while data not having one of these attributes may be stored to the additional storage tiers 316, including lower storage tier 306. Of course, one of skill in the art, upon reading the present descriptions, may devise many other combinations of storage media types to implement into different storage schemes, according to the embodiments presented herein.

According to some embodiments, the storage system (such as 300) may include logic configured to receive a request to open a data set, logic configured to determine if the requested data set is stored to a lower storage tier 306 of a tiered data storage system 300 in multiple associated portions, logic configured to move each associated portion of the requested data set to a higher storage tier 302 of the tiered data storage system 300, and logic configured to assemble the requested data set on the higher storage tier 302 of the tiered data storage system 300 from the associated portions.

Of course, this logic may be implemented as a method on any device and/or system or as a computer program product, according to various embodiments.

Referring now to conventional language pronunciation, commonly utilized accents are often distinguishable as having characteristics of distinctive foreign or domestic accents. These accents are sometimes marked by phonemes, syllables and/or general sound combinations, which to some listeners is difficult to understand. Moreover, these accents, which may be based on incorrect pronunciations to a respective listener may disrupt and/or slow down oral communication, commerce, other daily transactions, etc.

It is difficult for some people to reduce accents when speaking in a second language. Many people learning a second language may have difficulty in recognizing and correcting accent issues in the second language, which as mentioned elsewhere herein may reduce communication quality. Moreover, many people that speak with an accent in a second language also find it difficult to keep track of what they just said and learned when speaking in the second language.

Various embodiments described herein include systems and processes for evaluating vocal accents and providing correction feedback to assist a person in improving pronunciation accuracy.

Figure 4:
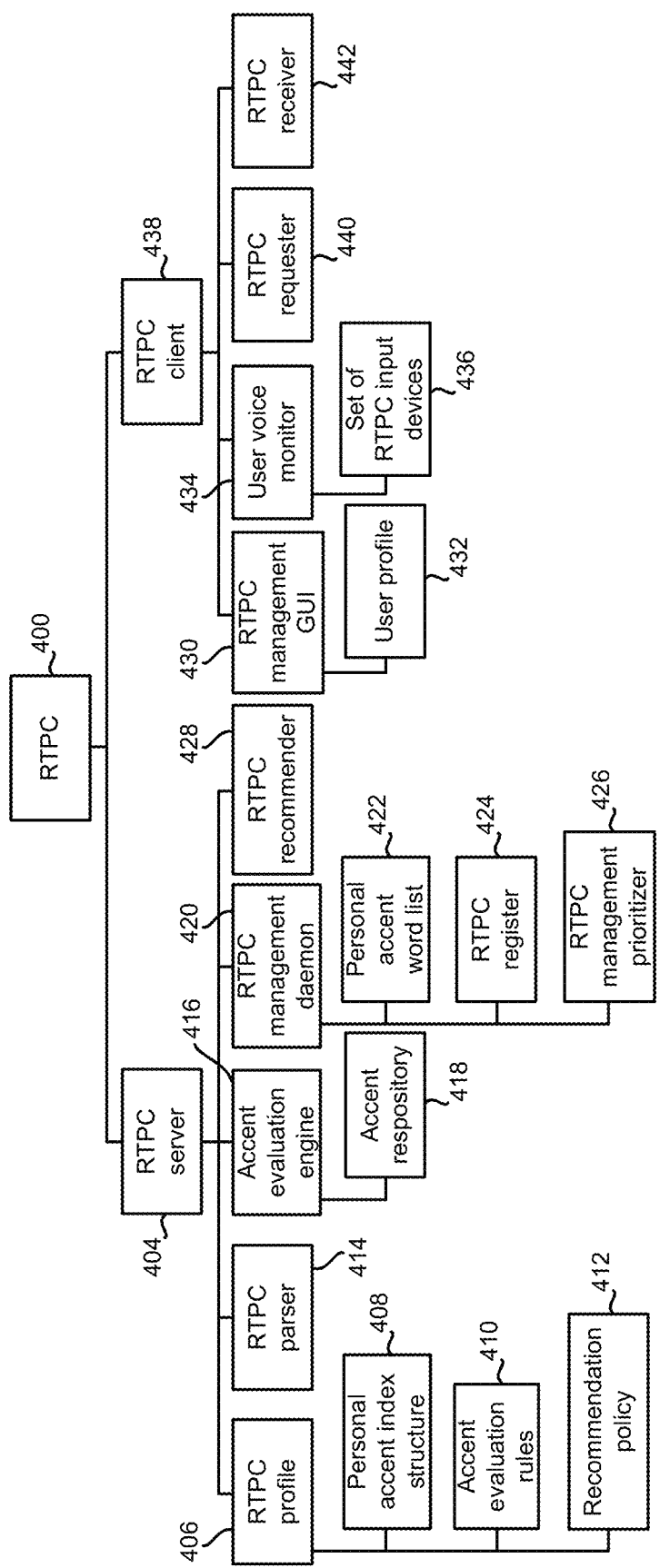
FIG. 4 is a diagram of a hierarchy in a real-time pronunciation correction system, in accordance with one embodiment.

FIG. 4 depicts the hierarchical architecture of a real-time pronunciation correction (RTPC) system 400 for evaluating vocal accents and providing correction feedback, in accordance with one embodiment. As an option, the present system 400 may be implemented in conjunction with features from any other embodiment listed herein, such as those described with reference to the other FIGS. Of course, however, such system 400 and others presented herein may be used in various applications and/or in permutations which may or may not be specifically described in the illustrative embodiments listed herein. Further, the system 400 presented herein may be used in any desired environment.

The RTPC system 400 may include an RTPC server module 404, and an RTPC client module 438. The RTPC server module 404 may include a plurality of components used on a "server side" of the system 400, e.g., the server side represented by modules 404-428. The RTPC client module 438 include a plurality of components used on a "client side" of the system 400, e.g., the client side represented by modules 430-442.

Referring now to the server side of the system 400, the RTPC server module 404 may include one or more, and preferably all, of the following modules: an RTPC profile module 406, an RTPC parser module 414, an accent evaluation engine module 416, an RTPC management daemon 420 and/or an RTPC recommender module 428.

According to one approach, the RTPC profile module 406 may include a configuration file for supporting RTPC. The configuration file includes configuration parameters to define how and when to serve clients in what types of correction according to different predefined or learned contexts. For instance, the service can be configured to be automatically disabled in a conference room, but enabled in bar or hotel lobby. The RTPC profile module 406 may include profile information for each unique user; a type or class of user, e.g., as selected based on user-specified type or class; etc. Moreover, the RTPC profile module 406 may include sub-modules, e.g., modules 408-412, that include information, policies and rules applicable to the user or user group whose accent is evaluated.

The RTPC profile module 406 may additionally and/or alternatively include a personal accent index structure module 408. The personal accent index structure module 408 may include a data structure for tracking words that are known and/or predetermined to pose pronunciation issues. According to a specific approach, the data structure for tracking words with accent problems may include any one or more of, e.g., the accent word, a user identification, an identification of a second language of the user, an identification of a native language of the user, an identification of an accent score of the user, etc. It should be noted that in-use examples using variables such as an accent score will be described in greater detail elsewhere herein, e.g., see method 500.

The RTPC profile module 406 may include one or more accent evaluation rules, e.g., see accent evaluation rules module 410. According to various approaches, accent evaluation rules may include a set of rules and/or options for evaluating the accent of a voice input, e.g., a spoken word. Since different regions and areas have different standards to judge a pronunciation, the different rules may be automatically or manually selected. For instance, for input, a rule may specify treatment of Indic English as having no accent, but another rule may specify Chinese English as having an accent. Any of a plurality of known accent evaluation methods and related rules may be selected and defined in the evaluation rules.

Moreover, the RTPC profile module 406 may include a recommendation policy module 412. The recommendation policy module 412 may include a set of recommendation and/or encourage policies, which may be predefined, set by a user, etc. Recommendation policies may be used, for example, to tailor the processing used in correcting and/or improving the pronunciation of a spoken word in a received audio input. According to one example, a user may select a "Britain English Pronunciation Repository" option of the recommendation policy module 412 as a recommended resource.

The RTPC parser module 414 may be used to parse a sentence or portion of a voice input for recognizing words in the voice input. According to one approach, a word list may be generated in response to and/or during parsing of the sentence and/or portion of a voice input.

Parsing by the RTPC parser module 414 may include using any known parsing techniques that would be appreciated by one skilled in the art upon reading the present descriptions. For example, parsing and word recognition operations may include using processes described in U.S. Pat. No. 5,068,789, which is herein incorporated by reference.

It should be noted that the RTPC client module 438 may additionally and/or alternatively include an RTPC parser module (although not shown on the client side of FIG. 4) for parsing the words of an audio input prior to requesting of RTPC services to be performed on voice inputs, e.g., see RTPC requester module 440. For example, according to one approach, in response to processing capabilities of the RTPC client module 438 being greater than processing capabilities of the RTPC server module 404, parsing operations may be reserved for or partially performed on the RTPC client module 438.

The accent evaluation engine module 416 may be used for identifying a user's accent, evaluating the user word accent of one or more words that the user pronounced, and/or generating an evaluated accent score. Such identification, evaluation and scoring will be described in greater detail elsewhere herein, e.g., see method 500 of FIG. 5. In one exemplary approach, processes described in U.S. Patent Pub. No. 20080147404, which is herein incorporated by reference, may be used.

According to one approach, the accent evaluation engine module 416 may include and/or access an accent repository module 418 storing information usable when evaluating a voice input.

The RTPC management daemon module 420 may be used to manage a detected accent word. For example, in response to the detected accent word being a new word, the RTPC management daemon module 420 may add, e.g., register, the word into the personal accent word list. In response to the detected accent word scoring better than the currently-stored score, the RTPC management daemon module 420 may update the word score in the personal accent word list and send an encouraging message to the user, e.g., based on predefined recommended encouragement policies from module 412. In response to the detected accent word scoring under the recommendation score based on the predefined recommendation policies, the word may be removed from the personal accent word list.

The RTPC management daemon module 420 may include a personal accent word list module 422. The personal accent word list module 422 may include a list of accent words which may be identifiable by the accent evaluation engine module 416. The personal accent word list module 422 may include multiple lists for different contexts. For instance, a user may want to improve his computer science terms in his presentation and Bonsai terms corresponding to a local gardening club. The user can select a computer word list and gardening word list to be used at the same time.

The RTPC management daemon module 420 may additionally and/or alternatively include a RTPC register module 424. The RTPC register module 424 may be responsible for registering and/or updating a determined accent word into a personal accent word list.

Moreover, the RTPC management daemon module 420 may additionally and/or alternatively include a RTPC management prioritizer module 426. The RTPC management daemon module 420 may be used to prioritize entries in the personal accent word list of module 422. The RTPC management daemon module 420 may additionally and/or alternatively remove a "no accent" word from the personal accent word list module 422, where a "no accent" word is one in which the accent score is below a threshold, indicative of little or no accent.

The RTPC server module 404 may additionally and/or alternatively include a RTPC recommender module 428. According to one approach, the RTPC recommender module 428 may be for recommending a correct pronunciation of an accent word to the user. The RTPC recommender module 428 may specify a user defined output medium, e.g., earphone, by which the client can output the correct pronunciation. The RTPC recommender module 428 may additionally and/or alternatively be used for encouraging a user if the user's word accent is reduced, e.g., relative to a prior evaluation of the word.

The RTPC recommender module 428 may additionally and/or alternatively select a destination for which the recommended correct pronunciation of the accent word should be output to. For example, the RTPC recommender module 428 may select an outputting of the recommended correct pronunciation of the accent word to a user home alert system with an audio speaker, in response to such a system being previously selected to be the destination of pronunciation correction feedback.

Referring now to the client side of system 400, the RTPC client module 438 may include an RTPC management graphical user interface (GUI) module 430, a user voice monitor module 434 user voice monitor module 434, a RTPC requester module 440, and/or a RTPC receiver module 442.

The RTPC management GUI module 430 may include a configuration user interface (UI) for controlling and/or managing real-time pronunciation correction services. According to one approach, personal information, e.g., education level, user native language, user second language, etc., and other preference settings may be input, e.g., by a user input, into the RTPC management GUI module 430. The RTPC management GUI module 430 may additionally and/or alternatively include a user profile module 432 that stores profile information about the user, such as the aforementioned personal information. Moreover, the GUI module 430 may allow a user to add and remove words to be analyze by the RTPC system.

The user voice monitor module 434 may monitor a user's voice streams (with the user's permission) and related context at the client and/or at one or more voice input devices 436 in communication with the client. For example, the voice monitoring may be implemented into one or more Internet of Things (IoT) devices.

The client running one or more modules of the RTPC client module 438 and/or the input device(s) may include any known voice monitoring device, e.g., mobile telephone, portable electronic, voice-enabled assistant, microphone, recording device, any other IoT device for collecting user voice streams, as would be appreciated by one skilled in the art upon reading the present descriptions, etc., for monitoring the voice of a user with the user's permission. For example, such devices may include, e.g. a refrigerator device, a television device, an air conditioner controller device, etc.

The RTPC requester module 440 may output representations of the user's voice inputs to the RTPC server module 404, and thereby request RTPC services to be performed on the voice inputs.

According to one approach, the RTPC requester module 440 may also send context information to assist the RTPC server module 404 in improving accuracy of the recommendation, e.g., for determining what kind of accent the user has, considering the audience that the voice input was directed toward, etc. For example, the RTPC requester module 440 may consider, e.g., the number of people that the voice input was delivered to, the languages that the listener of the voice input is familiar with, what kind of topic is being discussed, etc. and indicate this contextual information along with the request.

The RTPC receiver module 442 may receive a recommended pronunciation of an accent word. The RTPC receiver module 442 may include any known type of voice and/or text receiver.

In various embodiments, some or all of the server-side modules 406-428 may be implemented on the client. Therefore, the illustrative architecture of the RTPC system 400 of FIG. 4 is presented by way of example only.

Figure 5:
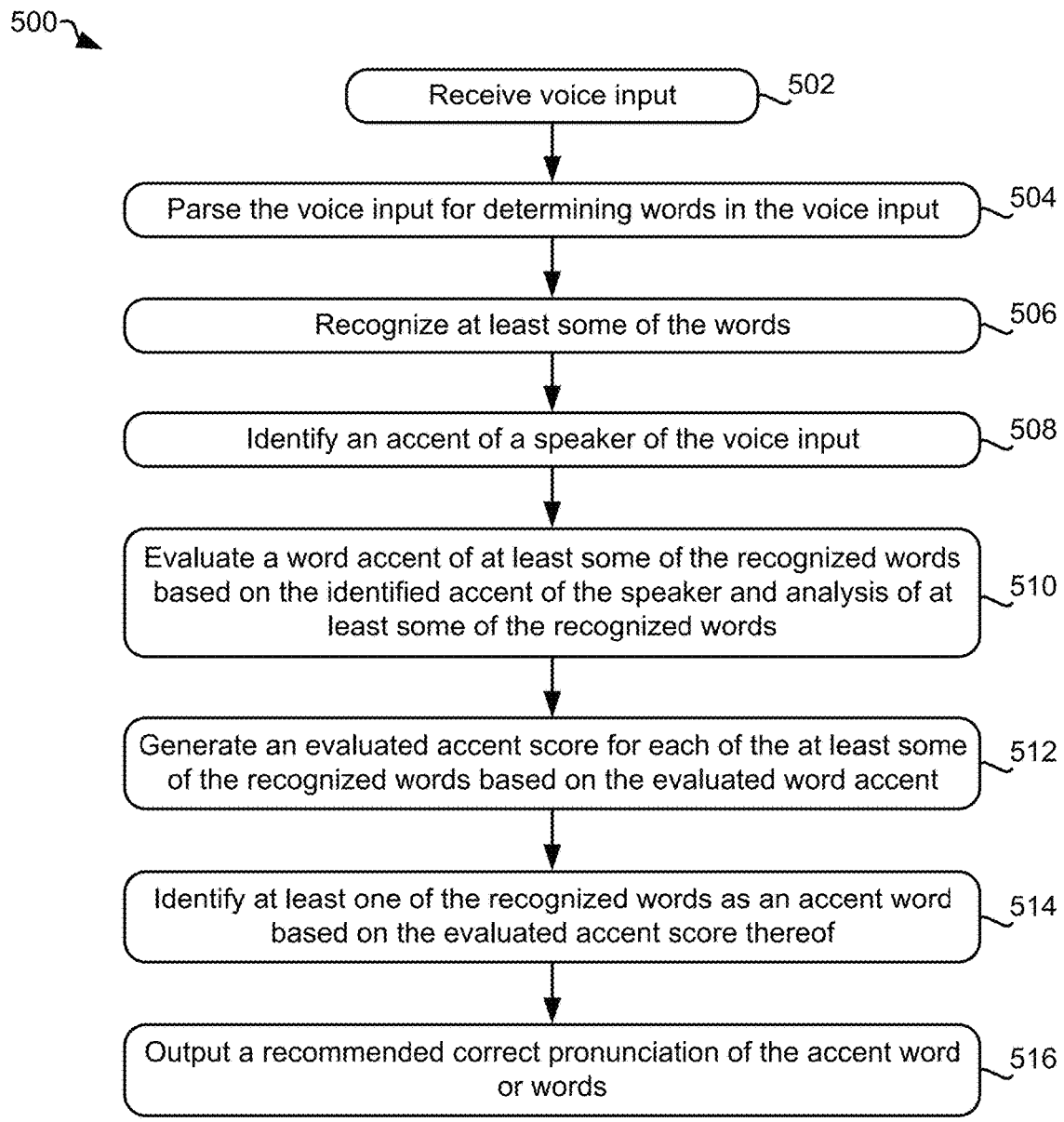
FIG. 5 is a flowchart of a method, in accordance with one embodiment.

Now referring to FIG. 5, a flowchart of a method 500 for evaluating vocal accents and providing correction feedback is shown according to one embodiment. The method 500 may be performed in accordance with the present invention in any of the environments depicted in FIGS. 1-4, among others, in various embodiments. Of course, more or less operations than those specifically described in FIG. 5 may be included in method 500, as would be understood by one of skill in the art upon reading the present descriptions.

Each of the steps of the method 500 may be performed by any suitable component of the operating environment. For example, in various embodiments, the method 500 may be partially or entirely performed by a computer, or some other device having one or more processors therein. The processor, e.g., processing circuit(s), chip(s), and/or module(s) implemented in hardware and/or software, and preferably having at least one hardware component may be utilized in any device to perform one or more steps of the method 500. Illustrative processors include, but are not limited to, a central processing unit (CPU), an application specific integrated circuit (ASIC), a field programmable gate array (FPGA), etc., combinations thereof, or any other suitable computing device known in the art.

It should be noted that various operations of method 500 may be described herein to be performed on a server side of an architecture, e.g., see system 400, however, according to other embodiments, various operations of method 500 may additionally and/or alternatively be implemented and/or performed on a user device.

Operation 502 of method 500 includes receiving voice input.

In embodiments in which operation 502 occurs on a server side of an architecture, the received voice input may be received, e.g., as a digitized audio file, from any type of a user device. According to one approach, the user device may include a computer. According to another approach, the user device may additionally and/or alternatively include a cellular device. According to yet another approach, the user device may additionally and/or alternatively include an audio recording device, where the voice of the audio was recorded with permission.

In embodiments in which operation 502 occurs on a user device side of an architecture, the received voice input may be received from a device component. According to one approach, the received voice input may be received from a microphone. According to another approach, the received voice input may include recorded audio.

Operation 504 of method 500 includes parsing the voice input for determining words in the voice input. For example, a user voice input "COMPUTER" may be parsed into the text "computer" and/or audio "kəmˈpyo͞otər." Parsing of voice input may include using any known parsing technique that would be appreciated by one skilled in the art upon reading the present descriptions. Operation 506 of method 500 includes recognizing at least some of the words. According to one approach, a parser component, e.g., the RTPC parser module 414 of system 400, may be used to parse and recognize each word of a received voice input, into text and/or audio elements.

According to various approaches, in response to not recognizing any of the words of the voice input, the voice input may be again parsed any number of times, e.g., one time, five times, until at least one of the words of the voice input are recognized, etc. According to other approaches, in response to not recognizing any of the words of the voice input, method 500 may optionally include outputting and/or generating a notification that no words of the received audio sample are recognized. Note that outputting operations of method 500 will be described elsewhere herein, e.g., see operation 516.

Operation 508 of method 500 includes identifying an accent of a speaker of the voice input.

According to one approach, the accent of a speaker of the voice input may be identified by accessing and/or in response to receiving information about the user, e.g., such as information that was previously stored in a personal accent index structure of the user. For example, the user profile information may simply denote the known accent of the user, e.g., Hindi.

In another approach, the accent of the speaker of the voice input may be identified using an accent evaluation engine or any known evaluation techniques. For example, according to various approaches, the accent of the speaker of the voice input may be identified such as comparing speech patterns of particular words that are indicative of a particular accent, processing all or a portion of the audio sample through filtering processes, etc. According to another example, identifying an accent of a speaker of the voice input may be performed using processes disclosed in U.S. Publication No. 20070038455 A1 and/or U.S. Pat. No. 9,552,810, which are herein incorporated by reference. Identifying the accent of a speaker of the voice input may be useful in evaluation of the recognized words, e.g., see operation 510.

Accordingly, operation 510 of method 500 includes evaluating a word accent of at least some of the recognized words based on the identified accent of the speaker and analysis of at least some of the recognized words. Evaluation of a word accent may include incorporating one or more sets of rules and/or options, e.g., by the accent evaluation engine 416 using rules provided by the RTPC profile module 406 of FIG. 4. It should be noted that, because different regions and areas of the world have many different standards when judging the pronunciation of a word, different accent evaluation rules may be automatically and/or manually selected. For example, according to one specific approach, an Indic English accent may be selected by a user in the accent evaluation rules to not be considered an accent when received as a voice input while a Chinese English accent may be selected in the accent evaluation rules to be considered an accent when received as a voice input.

According to various approaches, the accent evaluation rules may be automatically selected in response to receiving some type of input and/or in response to performing some type of determining. For example, the accent evaluation rules may be automatically selected in response to receiving an input of user credentials. According to another approach, the accent evaluation rules may be automatically selected in response to determining a geographical location at which the device on which method 500 is being performed is located. According to yet another example, the accent evaluation rules may be automatically selected in response to determining a geographical location from which received information originates.

According to other approaches, operation 510 may incorporate techniques described in U.S. Pat. Publication No. 20070038455 for evaluating a word accent of at least some of the recognized words.

According to yet further approaches, the accent evaluation rules may be manually selected, e.g., by a user subsequent an outputting of a plurality of options to a display.

Further, operation 512 of method 500 includes generating an evaluated accent score for each of the at least some of the recognized words based on the evaluated word accent. According to various approaches, generating an evaluated accent score for a recognized word may include using an accent evaluation engine or any known evaluation techniques, as described elsewhere herein. See e.g., the accent evaluation engine 416 of FIG. 4.

Evaluated accent scores of the recognized words may be represented by any type of scaled variable. According to various approaches, the evaluated accent score of the recognized words may be defined by a scaled numerical range, e.g., 0.0-1.0, 0.0-10.0, 0-100%, etc., where such numerical ranges represent little or no accent to a heavy accent therealong, or vice-versa. According to other approaches, the evaluated accent score of the recognized words may be defined by a scaled alphabetical range, e.g., A-F, A-Z, A-C, etc., where such alphabetical ranges represent little or no accent to a heavy accent, or vice-versa.

Referring now to a specific example, which should not be interpreted to limit descriptions herein, assume that a user has a native language proficiency of Hindi, and a second language of English. The user says the recognized word "computer" in English. Based on the user's evaluated word accent, an evaluated accent score of 0.5 is generated with respect to a predefined numerical score range of 0.0-1.0. A personal accent index structure for the user may be updated and/or saved as AccentWord("computer", UserID, English, Hindi, 0.5).

Because the evaluated accent score of a recognized word establishes a context of how severe, e.g., needs improvement, or alternatively minimal, e.g., close to about non-existent, an accent of a recognized word is, the evaluated accent score may be used to identify if any of the recognized words should be considered an accent word.

Accordingly, operation 514 of method 500 includes identifying at least one of the recognized words as an accent word based on the evaluated accent score thereof. According to one approach, identifying at least one of the recognized words as an accent word based on the evaluated accent score thereof may include determining whether the evaluated accent score is in a predefined range, e.g., above or below a predetermined threshold.

According to another approach, identifying at least one of the recognized words as an accent word based on the evaluated accent score thereof may additionally and/or alternatively include accessing a table of scores. For example, a table of scores may be continually updated with scores that have been determined to be accent word scorings. In the present example, in response to determining that the evaluated accent score of a recognized word exists in the table upon an accessing of the table of scores, the recognized word may be identified as an accent word. In contrast, in response to determining that the evaluated accent score of a recognized word does not exist in the table upon an accessing of the table of scores, the recognized word may be determined to not be an accent word.

In response to identifying at least one of the recognized words as an accent word based on the evaluated accent score thereof, method 500 may include attempting to facilitate the correction of the pronunciation of the accent word or words. Accordingly, operation 516 of method 500 includes outputting a recommended correct pronunciation of the accent word or words. Because as previously described elsewhere herein, method 500 may be performed on a server side and/or a device (client) side of an environment, e.g., see system 400 of FIG. 4, the destination of the outputting of operation 516 may vary depending on the approach. For example, according to one approach, where method 500 is performed on a server side of an architecture, operation 516 may include transmitting the recommended correct pronunciation of the accent word or words to a user device. According to another approach, where method 500 is performed on a device (client) side of an architecture, operation 516 may include outputting the recommended correct pronunciation of the accent word or words to one or more presentation components of the device, e.g., an audible speaker, an earphone, a Bluetooth device, a GUI, etc.

It should be noted that information of the recommended correct pronunciation may additionally and/or alternatively be output to a pronunciation repository. Such repositories may be subsequently accessed by one or more devices while performing method 500 and/or any other methods described elsewhere herein.

Figure 6:
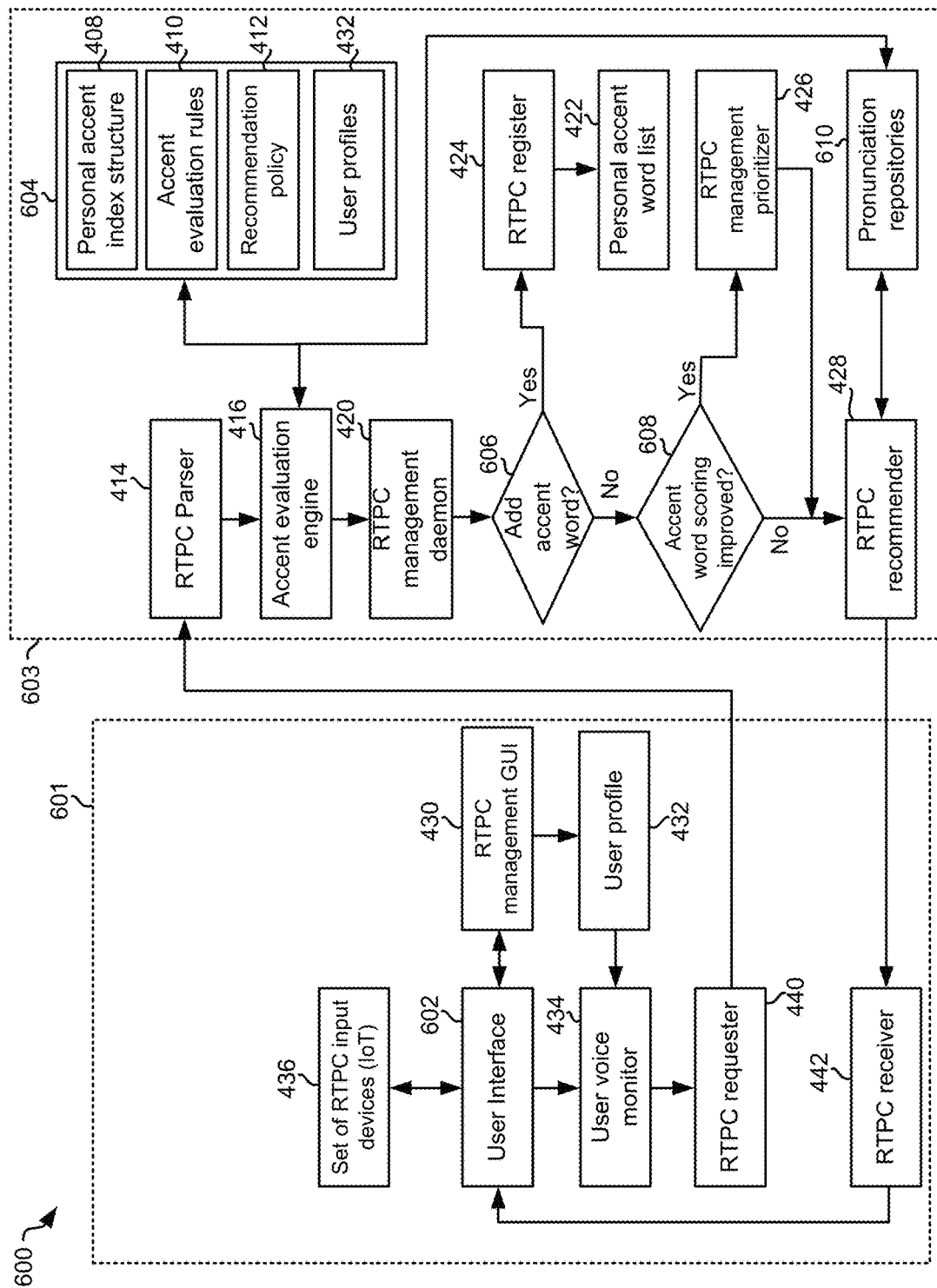
FIG. 6 is a flowchart of a method, in accordance with one embodiment.

FIG. 6 graphically depicts a method 600 for evaluating vocal accents, maintaining an accent word list, and providing correction feedback in real time in accordance with one embodiment. As an option, the present method 600 may be implemented in conjunction with features from any other embodiment listed herein, such as those described with reference to the other FIGS. Of course, however, such method 600 and others presented herein may be used in various applications and/or in permutations which may or may not be specifically described in the illustrative embodiments listed herein. Further, the method 600 presented herein may be used in any desired environment.

It should be noted that the logical path of method 600 of FIG. 6 passes through various modules of system 400 of FIG. 4. Accordingly, such components are commonly numbered in FIG. 4 and FIG. 6.

FIG. 6 illustrates a client side 601 e.g., including a user device such as a mobile phone, tablet, etc.; and a server side 603 e.g., at a server such as an online server, a cloud service, etc.

Referring to the client side 601, a user interface 602 is provided. The user interface may include one or a combination of, e.g., a display, a microphone, a touchpad, etc. The RTPC management GUI module 430 may be initialized in response to user input received via the user interface 602. For example, the RTPC GUI module 430 may specify display of a mobile application, a web-based application, etc. corresponding to the RTPC system. Further selections may be received on the user interface 602, e.g., based on a configuration specified by the RTPC GUI module 430 for output via the user interface 602.

According to one approach, the selection may correspond to and/or select a user profile of a user profile module 432. According to another approach, the selection may include an inputting of various user credentials that correspond to a user profile module 432.

The user voice monitor module 434 may monitor a user's voice streams (with the user's permission) and related context receive from the user interface 602 (e.g., microphone of the device) and/or the set of RTPC input devices (IoT) 436, and output portions of such streams for RTPC evaluation. The portions of the streams captured may be selected in view of the user profile information. Particularly, the user voice monitor module 434 may send the portions to the RTPC requester module 440, which in turn sends them to the server side 603 for analysis. For example, the RTPC requester module 440 may output representations of the user's voice input to the RTPC server module 404, optionally along with user profile information, and thereby request RTPC services to be performed on the voice input.

On the server side 603, the voice input may be parsed using a RTPC parser module 414, for determining words in the voice input. At least some of the words of the voice input may be recognized.

Moreover, an accent evaluation engine 416 may be used for identifying a user's accent, evaluating the user word accent of one or more words that the voice input may include, and/or generating an evaluated accent score. Moreover, the accent evaluation engine 416 may evaluate audio of the voice input and/or text that was generated during recognition of words of an audible voice input, e.g., see operation 506 of method 500 of FIG. 5.

Referring again to FIG. 6, it should be noted that the accent evaluation engine module 416 may include one or more accent evaluation engines. According to one approach, where a plurality of accent evaluation engines are present, a particular accent evaluation engine may be selected for use based on the findings of the RTPC parser module 414.

According to various approaches, the accent evaluation engine 416 may use any one or more of a personal accent index structure, accent evaluation rules, recommendation policies corresponding to a user profile, user profiles, etc., during RTPC processing of the voice input, e.g., for selecting particular ones of the recognized words for scoring, for assigning of an accent score to the selected recognized words, etc. See RTPC profile module 604, which includes a personal accent index structure module 408, accent evaluation rules module 410, recommendation policy module 412, and user profiles module 432.

Subsequent to assignment of evaluated accent scores to the selected recognized words of the voice input, at least one of the recognized words may be identified as an accent word based on the evaluated accent score thereof. With one or more of the accent words identified as accent words, a RTPC management daemon module 420 may be used to manage and maintain a personal accent word list. A personal accent word list may be used to compare the severity or minimal degree of the accent of the spoken accent words.

Accordingly, decision 606 of method 600 includes determining if an identified accent word is already registered in a personal accent word list 422, which may be particular to the speaker of the voice input. In response to determining that the identified accent word is not already registered into the personal accent word list 422, the identified accent word may be registered into the personal accent word list 422. According to one approach, an RTPC register module 424 may be used in registering the identified accent word into the personal accent word list 422.

In contrast, in response to determining that the identified accent word is already registered in the personal accent word list 422, it may be determined if the score of the identified accent word should be updated in the personal accent word list 422, e.g., see decision 608 of method 600. According to various approaches, a score of the identified accent word may be updated in the personal accent word list 422 using the evaluated accent score, e.g., in response to the evaluated accent score being greater than or less than a previous accent score of the accent word stored in the personal accent word list.

According to one approach, as illustrated in FIG. 6, in response to determining that the accent score of the identified accent word has improved, the score of the identified accent word may be updated in the personal accent word list 422 using the evaluated accent score, e.g., using a RTPC management prioritizer module 426. For example, assume that the evaluated accent score of the recognized words are defined by the scaled numerical range 0.0-1.0, where the numerical range represent little or no accent to a heavy accent therealong. An accent score may be determined to have improved in response to the newest accent score of a particular accent word being a lower numerical value than an accent score of the accent word previous the newest score.

In response to determining that the accent score of the identified accent word has improved, an output may be generated reflecting the improvement. For example, a message of encouragement may be generated for outputting in response to determining that the accent score of the identified accent word has improved. Any messages and/or feedback that is generated during method 600 may be output to the client side 601, e.g., from the RTPC recommender module 428 to a RTPC receiver module 442 on the client side 601.

According to yet another approach, in response to determining that the evaluated accent score thereof is in a predefined range, e.g., below a threshold, a word (preferably the accent word with such scoring) may be removed from the personal accent word list.

In response to determining that the accent score of the identified accent word has not improved, e.g., has remained the same score or has worsened, the score of the identified accent word may be kept the same or may be updated in the personal accent word list 422 using the evaluated accent score.

Such scores and accent words of the personal accent word list may be represented by a table. For purposes of an example, referring now to FIG. 7, a table 700 includes personal accent words and associated accent scores for a particular speaker. For example, the words: computer, academy, Amazon, communication, globalization, hierarchical, heterogeneous, good, and morning, may have associated accent scores: 0.7, 0.7, 0.6, 0.6, 0.5, 0.8, 0.9, 0.1, and 0.9 respectively, for the particular speaker.

Referring again to FIG. 6, one or more operations of method 600 may include outputting encouraging messages and/or pronunciation feedback from the server side 603 to the client side 601. According to various approaches, such messages and/or pronunciation feedback preferably may notify the speaker of the evaluated voice input that an incorrect pronunciation has occurred, and moreover provide assistive feedback that may be used to improve pronunciations/mitigate accents thereafter.

For example, in response to the score of the identified accent word being better than the score in the personal accent word list as found prior to the updating, e.g., the updating associated with the "Yes" logical path of decision 608, an encouraging message may be generated by the RTPC recommender module 428, and output to the RTPC receiver module 442.

According to another example, which is in no way intended to limit the descriptions herein, the RTPC recommender module 428 may generate and/or receive a recommend correct pronunciation of an accent word for outputting in a message. According to one approach, the correct pronunciation of an accent word may be generated using a pronunciation repositories module 610. The pronunciation repositories module 610 may retrieve an audio file of the correct pronunciation from a local or remote database. The pronunciation repositories module 610 may operate in association with information and or processes of any one or more of the personal accent index structure module 408, the accent evaluation rules module 410, the recommendation policy module 412, the user profiles module 432, known accent repositories, etc., in the recommend correct pronunciation of an accent word.

The recommend correct pronunciation of an accent word, and/or any other message output to the client side 601 may be received by the RTPC receiver module 442 and thereafter presented using the user interface module 602 and/or other component(s) on the RTPC client side 601, to facilitate a reduced degree of accent in subsequent speech. According to various examples, where the voice input of method 600 is associated with a user, method 600 may include outputting the recommend correct pronunciation of an accent word to a speaker, earphone, visual display (e.g., phonetically), etc., for inspection by the user.

It should be noted that in some approaches a voice input may include an extent of accent words that would be inefficient to attempt to provide recommended correct pronunciation ongoingly. For example, where a user is speaking a large number of accent words in a short amount of time, it may be difficult and/or inefficient to deliver a recommended correct pronunciation for each of the identified accent words to a user, while the user attempts to continue talking. Accordingly, identifying at least one of the recognized words as an accent word may additionally and/or alternatively include comparing the recognized words to a personal accent word list of the speaker, and in response to the recognized words matching words in the personal accent word list, such words may be prioritized for output of the recommended correct pronunciation thereof.

According to one approach prioritizing words for outputting of the recommended correct pronunciation thereof may include outputting a predetermined number of accent words that have the highest relative evaluated accent scores, and that match words in the personal accent word list. For example, referring again to the personal accent words and scores of table 700 of FIG. 7, assume that the two words "communication" and "morning" are recognized from a voice input and are identified to be accent words that match words of the table 700. Also assume that the accent scores 0.6 and 0.9 reflect the most current evaluated accent scores of the accent words "communication" and "morning" (respectively). Yet further assume that prioritizing words for outputting of the recommended correct pronunciation thereof includes outputting only one accent word of a voice input, which has the highest relative evaluated accent score. Accordingly, in response to the word "morning" having a higher most recent relative accent score than the word "communication," the recommended correct pronunciation of the word "morning" may be prioritized for outputting.

In a variation of the method of FIG. 6, words of a user may be replaced, e.g., in about real time, with audio samples of the words pronounced correctly, and the corrected voice stream then being output. For example, accent words of an audible voice input may be replaced with said audio samples in about real time, thereby creating a corrected audible voice stream. The corrected audible voice stream, having correct pronunciations, may thereafter be output. Processes described in U.S. Publication No. 20170154622 and/or U.S. Pat. No. 7,593,849 may be used for replacing accent words of a received audio sample, and are herein incorporated by reference.

It should be noted that recommended correct pronunciations of accent words may appeal to a huge portion of the global population that struggle with pronunciation issues, particularly when speaking a second language. This portion of the global population also undoubtedly overlaps with the huge portion of smart phone users. Note that the population of smart phone users as of 2016 totaled 2.08 billion users. Therefore, systems such as those presented herein could be made readily available to large numbers of users.

Figure 8:
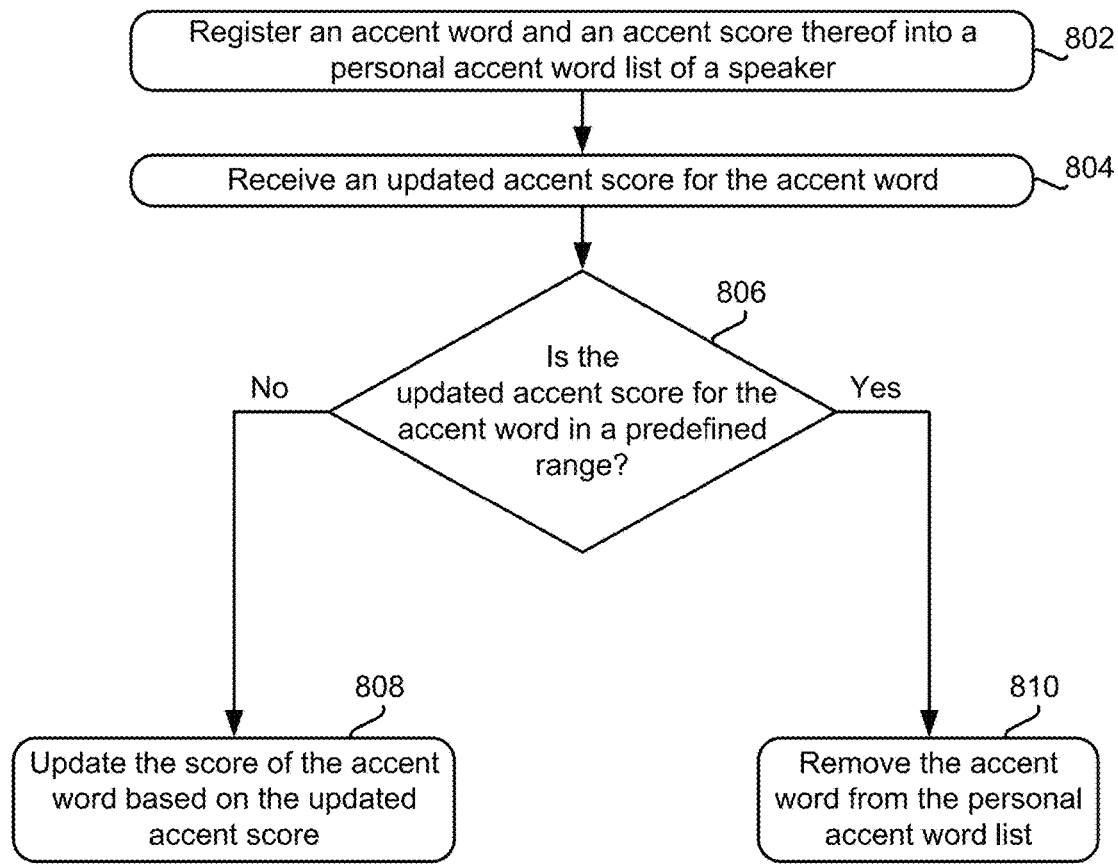
FIG. 8 is a flowchart of a method, in accordance with one embodiment.

Now referring to FIG. 8, a flowchart of a method 800 for maintaining a personal accent word list is shown according to one embodiment. The method 800 may be performed in accordance with the present invention in any of the environments depicted in FIGS. 1-7, among others, in various embodiments. Of course, more or less operations than those specifically described in FIG. 8 may be included in method 800, as would be understood by one of skill in the art upon reading the present descriptions.

Each of the steps of the method 800 may be performed by any suitable component of the operating environment. For example, in various embodiments, the method 800 may be partially or entirely performed by a computer, or some other device having one or more processors therein. The processor, e.g., processing circuit(s), chip(s), and/or module(s) implemented in hardware and/or software, and preferably having at least one hardware component may be utilized in any device to perform one or more steps of the method 800. Illustrative processors include, but are not limited to, a central processing unit (CPU), an application specific integrated circuit (ASIC), a field programmable gate array (FPGA), etc., combinations thereof, or any other suitable computing device known in the art.

Operation 802 of method 800 includes registering an accent word and an accent score thereof into a personal accent word list of a speaker.

According to various approaches, registering an accent word and an accent score thereof into a personal accent word list of a speaker may include storing the accent word and accent score thereof, e.g., to a memory module, to a table (see FIG. 7), to a processing circuit, etc.

According to one approach, registering an accent word and an accent score thereof into a personal accent word list may include creating a database, e.g., see the table of FIG. 7, and storing the accent word and accent score thereof into a personal accent word list in the database. According to another approach, registering an accent word and an accent score thereof into a personal accent word list may include determining if a preexisting personal accent word list includes the accent word, and storing the accent word and the accent score thereof into the personal accent word list in response to determining the personal accent word list does not already including the accent word.

After establishing a personal accent word list, the personal accent word list may be thereafter maintained, as will now be described below.

Accordingly, operation 804 of method 800 includes receiving an updated accent score for the accent word.

Decision 806 of method 800 includes determining whether the updated accent score for the accent word is in a predefined range. Ranges have been described in greater detail elsewhere herein, e.g., see numerical ranges and alphabetical ranges of operation 512 of method 500. According to one approach, the predefined range may include a threshold.

In response to determining that the updated accent score is in the predefined range, the accent word may be removed from the personal accent word list, e.g., see operation 810. For example, according to one approach, where the predefined range is defined by a threshold, the accent word may be removed from the personal accent word list in response to determining that the updated accent score is below the threshold.

In response to determining that the updated accent score is outside of the predefined range (as noted by the "No" logical path leading from decision 806), the score of the accent word based on the updated accent score may be updated, e.g., see operation 808.

For purposes of an example, referring back to FIG. 7, assume that a most recently received updated accent score for the accent word "communication" is 0.4. Also assume that in such an example, that the personal accent word list of table 700 has a predefined range of 0.0-0.1 and a numerical scoring range of 0.0-1.0 (little to severe accent). The updated accent score of 0.4 may be determined to not be in the predefined range of 0.0-0.1. Accordingly, the accent score of the accent word "communication" may be updated from the score of 0.6 to the newest received score of 0.4. In furtherance of the present example, if the accent score for the word "communication" was 0.1, such a score may be determined to be within the predefined range, and thereby the accent word may be removed from the accent word list.

According to various approaches, method 800 may additionally and/or alternatively include an operation for maintaining a plurality of personal accent word lists each corresponding to a different context. Contexts may vary depending on the approach. According to various approaches, contexts may correspond to the interests of a user, e.g., history, hobbies, interests, etc. According to other approaches, contexts may correspond to different geographical locations. According to yet further approaches, contexts may correspond to predetermined preferences, e.g., such as a plurality of preferences received from user inputs.

To maintain a plurality of personal accent word lists, filtering may be applied subsequent to parsing and/or word recognition operations described elsewhere herein, e.g., see operations 504 and 506 of method 500. According to one approach, filtering of a plurality of personal accent word lists may include pre-assigning a plurality of words to particular personal accent word lists (having a particular context) of the plurality of personal accent word lists. For example, assume that the word "granite" has been pre-assigned to a particular personal accent word list associated with a geology context. In response to thereafter receiving a voice input, and evaluating the word "granite" from the voice input to be an accent word, the accent word "granite" may be filtered into and registered into the word list corresponding to the geology context, if the word "granite" was not already registered in the word list corresponding to the geology context.

It should be noted that any of such contexts may be selectively selected and/or unselected at any time. For example, contexts may be selectively selected and/or unselected, e.g., via automatic selection, via random selection, via user selection, etc.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a LAN or a WAN, or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Moreover, a system according to various embodiments may include a processor and logic integrated with and/or executable by the processor, the logic being configured to perform one or more of the process steps recited herein. The processor may be of any configuration as described herein, such as a discrete processor or a processing circuit that includes many components such as processing hardware, memory, I/O interfaces, etc. By integrated with, what is meant is that the processor has logic embedded therewith as hardware logic, such as an application specific integrated circuit (ASIC), a FPGA, etc. By executable by the processor, what is meant is that the logic is hardware logic; software logic such as firmware, part of an operating system, part of an application program; etc., or some combination of hardware and software logic that is accessible by the processor and configured to cause the processor to perform some functionality upon execution by the processor. Software logic may be stored on local and/or remote memory of any memory type, as known in the art. Any processor known in the art may be used, such as a software processor module and/or a hardware processor such as an ASIC, a FPGA, a central processing unit (CPU), an integrated circuit (IC), a graphics processing unit (GPU), etc.

It will be clear that the various features of the foregoing systems and/or methodologies may be combined in any way, creating a plurality of combinations from the descriptions presented above.

It will be further appreciated that embodiments of the present invention may be provided in the form of a service deployed on behalf of a customer to offer service on demand.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A computer-implemented method, comprising:
receiving voice input;
parsing the voice input for determining words in the voice input;
recognizing at least some of the words;
identifying an accent of a speaker of the voice input;
evaluating a word accent of at least some of the recognized words based on the identified accent of the speaker and analysis of the recognized words;
generating an evaluated accent score for each of the at least some of the recognized words based on the evaluated word accent;
identifying at least one of the recognized words as an accent word based on the evaluated accent score thereof;
registering the identified accent word into a personal accent word list of the speaker; and
outputting a recommended correct pronunciation of the accent word or words.

2. The computer-implemented method of claim 1, comprising removing a word from the personal accent word list of the speaker in response to determining that the evaluated accent score thereof is in a predefined range.

3. The computer-implemented method of claim 1, comprising updating a score of the identified accent word in the personal accent word list of the speaker using the evaluated accent score.

4. The computer-implemented method of claim 3, comprising outputting a message in response to the score of the identified accent word being better than a score in the personal accent word list immediately prior to the updating.

5. The computer-implemented method of claim 1, wherein identifying at least one of the recognized words as an accent word further includes comparing the recognized words to the personal accent word list of the speaker, wherein recognized words matching words in the personal accent word list are prioritized for output of the recommended correct pronunciation thereof.

6. The computer-implemented method of claim 5, wherein a plurality of personal accent word lists of the speaker exists, and comprising receiving selection of a context, and in response to receiving the selection of the context, selecting the personal accent word list corresponding to the selected context.

7. A computer-implemented method for maintaining a personal accent word list, the computer-implemented method comprising:
maintaining a plurality of personal accent word lists of a speaker, wherein the personal accent word lists correspond to different contexts;
registering an accent word and an accent score thereof into a first personal accent word list of the plurality of personal accent word lists;
receiving an updated accent score for the accent word;
determining whether the updated accent score for the accent word is in a predefined range;
updating the accent score of the accent word based on the updated accent score in response to the updated accent score being outside the predefined range; and
removing the accent word from the first personal accent word list in response to the updated accent score being in the predefined range.

8. A computer program product for real time pronunciation analysis and correction feedback, the computer program product comprising a non-transitory computer readable storage medium having program instructions embodied therewith, the program instructions readable and/or executable by a computer, to cause the computer to perform a method comprising:
receiving, by the computer, voice input;
parsing, by the computer, the voice input for determining words in the voice input;
recognizing, by the computer, at least some of the words;
identifying, by the computer, an accent of a speaker of the voice input;
evaluating, by the computer, a word accent of the recognized words based on the identified accent of the speaker and analysis of the recognized words;
generating, by the computer, an evaluated accent score for each of the recognized words based on the evaluated word accent;
identifying, by the computer, at least one of the recognized words as an accent word based on the evaluated accent score thereof;
updating, by the computer, a score of the identified accent word in a personal accent word list of the speaker using the evaluated accent score; and
outputting, by the computer, a recommended correct pronunciation of the accent word or words.

9. The computer program product of claim 8, comprising program instructions for registering, by the computer, the identified accent word into a personal accent word list of the speaker.

10. The computer program product of claim 8, comprising program instructions for outputting, by the computer, a message in response to the score of the identified accent word being better than a score in the personal accent word list immediately prior to the updating.

11. The computer program product of claim 8, comprising program instructions for removing, by the computer, a word from the personal accent word list of the speaker in response to determining, by the computer, that the evaluated accent score thereof is in a predefined range.

12. The computer program product of claim 8, wherein identifying at least one of the recognized words as an accent word further includes comparing, by the computer, the recognized words to the personal accent word list of the speaker, wherein recognized words matching words in the personal accent word list are prioritized, by the computer, for output of the recommended correct pronunciation thereof.

13. The computer program product of claim 12, wherein a plurality of personal accent word lists of the speaker exists, and comprising receiving, by the computer, selection of a context, and in response to receiving the selection of the context, selecting, by the computer, the personal accent word list corresponding to the selected context.

* * * * *